(12) United States Patent
Biler

(10) Patent No.: US 8,971,019 B2
(45) Date of Patent: Mar. 3, 2015

(54) WET CAPACITOR CATHODE CONTAINING AN ALKYL-SUBSTITUTED POLY(3,4-ETHYLENEDIOXYTHIOPHENE)

(71) Applicant: AVX Corporation, Fountain Inn, SC (US)

(72) Inventor: Martin Biler, Novy Jicin (CZ)

(73) Assignee: AVX Corporation, Fountain Inn, SC (US)

( * ) Notice: Subject to any disclaimer, the term of this patent is extended or adjusted under 35 U.S.C. 154(b) by 201 days.

(21) Appl. No.: 13/783,766

(22) Filed: Mar. 4, 2013

(65) Prior Publication Data

US 2013/0242467 A1    Sep. 19, 2013

Related U.S. Application Data

(60) Provisional application No. 61/611,724, filed on Mar. 16, 2012.

(51) Int. Cl.

| | |
|---|---|
| *H01G 9/02* | (2006.01) |
| *H01G 9/042* | (2006.01) |
| *C25D 9/02* | (2006.01) |
| *H01G 9/035* | (2006.01) |

(Continued)

(52) U.S. Cl.
CPC ............. *H01G 9/0425* (2013.01); *C25D 9/02* (2013.01); *H01G 9/035* (2013.01); *H01G 9/145* (2013.01); *C09D 5/4476* (2013.01); *H01G 9/08* (2013.01)
USPC ........... 361/504; 361/503; 361/516; 361/519; 361/525; 361/528

(58) Field of Classification Search
USPC ......... 361/504, 503, 508, 509, 512, 516–519, 361/523–525, 528–529
See application file for complete search history.

(56) References Cited

U.S. PATENT DOCUMENTS

| | | | |
|---|---|---|---|
| 2,453,103 A | 11/1948 | Turnbill, Jr. | |
| 3,345,545 A | 10/1967 | Bourgault et al. | |

(Continued)

FOREIGN PATENT DOCUMENTS

| | | |
|---|---|---|
| CZ | 301500 | 3/2010 |
| EP | 0440097 | 7/1991 |

(Continued)

OTHER PUBLICATIONS

Search Report for GB1304126.4 dated Aug. 1, 2013, 3 pages.

(Continued)

*Primary Examiner* — Nguyen T Ha
(74) *Attorney, Agent, or Firm* — Dority & Manning, P.A.

(57) ABSTRACT

A wet electrolytic capacitor that contains an anodically oxidized porous anode body, a cathode containing a metal substrate coated with a conductive coating, and a working electrolyte that wets the dielectric on the anode. The conductive coating contains an alkyl-substituted poly(3,4-ethylenedioxythiophene) having a certain structure. Such polymers can result in a higher degree of capacitance than many conventional types of coating materials. Further, because the polymers are generally semi-crystalline or amorphous, they can dissipate and/or absorb the heat associated with the high voltage. The degree of surface contact between the conductive coating and the surface of the metal substrate may also be enhanced in the present invention by selectively controlling the manner in which the conductive coating is formed.

25 Claims, 3 Drawing Sheets

(51) Int. Cl.
*H01G 9/145* (2006.01)
*C09D 5/44* (2006.01)
*H01G 9/08* (2006.01)

(56) References Cited

U.S. PATENT DOCUMENTS

| | | | |
|---|---|---|---|
| 4,945,452 A | 7/1990 | Sturmer et al. |
| 5,111,327 A | 5/1992 | Blohm et al. |
| 5,236,627 A | 8/1993 | Hannecart et al. |
| 5,284,723 A | 2/1994 | Hannecart et al. |
| 5,300,575 A | 4/1994 | Jonas et al. |
| 5,344,902 A | 9/1994 | Harwood et al. |
| 5,369,547 A | 11/1994 | Evans |
| 5,370,981 A | 12/1994 | Krafft et al. |
| 5,457,862 A | 10/1995 | Sakata et al. |
| 5,463,056 A | 10/1995 | Jonas |
| 5,473,503 A | 12/1995 | Sakata et al. |
| 5,519,147 A | 5/1996 | Swager et al. |
| 5,729,428 A | 3/1998 | Sakata et al. |
| 5,754,394 A | 5/1998 | Evans et al. |
| 5,812,367 A | 9/1998 | Kudoh et al. |
| 5,949,639 A | 9/1999 | Maeda et al. |
| 6,191,936 B1 | 2/2001 | Webber et al. |
| 6,197,252 B1 | 3/2001 | Bishop et al. |
| 6,322,912 B1 | 11/2001 | Fife |
| 6,369,239 B2 | 4/2002 | Rauchschwalbe et al. |
| 6,391,275 B1 | 5/2002 | Fife |
| 6,416,730 B1 | 7/2002 | Fife |
| 6,527,937 B2 | 3/2003 | Fife |
| 6,528,662 B2 | 3/2003 | Jonas |
| 6,576,099 B2 | 6/2003 | Kimmel et al. |
| 6,592,740 B2 | 7/2003 | Fife |
| 6,594,140 B1 | 7/2003 | Evans et al. |
| 6,635,729 B1 | 10/2003 | Groenendaal et al. |
| 6,639,787 B2 | 10/2003 | Kimmel et al. |
| 6,713,637 B2 | 3/2004 | Groenendaal |
| 6,734,312 B2 | 5/2004 | Reynolds et al. |
| 6,756,473 B2 | 6/2004 | Reuter et al. |
| 6,842,328 B2 | 1/2005 | Schott et al. |
| 6,852,830 B2 | 2/2005 | Groenendaal et al. |
| 6,891,016 B2 | 5/2005 | Reuter et al. |
| 6,927,298 B2 | 8/2005 | Groenendaal et al. |
| 6,987,663 B2 | 1/2006 | Merker et al. |
| 7,002,790 B2 | 2/2006 | Hossick-Schott et al. |
| 7,053,174 B2 * | 5/2006 | Kirchmeyer et al. ......... 528/377 |
| 7,079,377 B2 | 7/2006 | Schott et al. |
| 7,094,865 B2 | 8/2006 | Groenendaal et al. |
| 7,102,016 B2 | 9/2006 | Reuter |
| 7,105,237 B2 | 9/2006 | Sotzing |
| 7,116,548 B2 | 10/2006 | Satterfield, Jr. et al. |
| 7,118,690 B2 | 10/2006 | Wessling et al. |
| 7,154,740 B2 | 12/2006 | Merker et al. |
| 7,220,397 B2 | 5/2007 | Kimmel et al. |
| 7,224,576 B2 | 5/2007 | Hossick-Schott |
| 7,256,982 B2 | 8/2007 | Lessner et al. |
| 7,262,511 B2 | 8/2007 | Osako et al. |
| 7,279,015 B2 | 10/2007 | Merker |
| 7,341,705 B2 | 3/2008 | Schnitter |
| 7,341,801 B2 | 3/2008 | Reuter et al. |
| 7,358,326 B2 | 4/2008 | Heuer et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,438,832 B2 | 10/2008 | Majumdar et al. |
| 7,449,588 B2 | 11/2008 | Jonas et al. |
| 7,499,260 B2 | 3/2009 | Schott et al. |
| 7,515,396 B2 | 4/2009 | Biler |
| 7,569,158 B2 | 8/2009 | Waller et al. |
| 7,578,859 B2 | 8/2009 | Reynolds et al. |
| 7,585,983 B2 | 9/2009 | Reuter et al. |
| 7,601,871 B2 | 10/2009 | Siggel et al. |
| 7,641,807 B2 | 1/2010 | Siggel et al. |
| 7,667,954 B2 | 2/2010 | Lessner et al. |
| 7,687,102 B2 | 3/2010 | Hossick-Schott et al. |
| 7,696,669 B2 | 4/2010 | Kudoh |
| 7,714,124 B2 | 5/2010 | Scheibel et al. |
| 7,736,398 B2 | 6/2010 | Tateishi et al. |
| 7,745,520 B2 | 6/2010 | Shao et al. |
| 7,750,099 B2 | 7/2010 | Chikusa et al. |
| 7,754,053 B2 | 7/2010 | Maase |
| 7,785,493 B2 | 8/2010 | Jonas et al. |
| 7,785,741 B2 | 8/2010 | Viavattine |
| 7,972,534 B2 | 7/2011 | Merker et al. |
| 7,973,180 B2 | 7/2011 | Morita et al. |
| 7,990,683 B2 * | 8/2011 | Qiu et al. ............ 361/525 |
| 7,994,345 B2 | 8/2011 | Brassat et al. |
| 8,027,150 B2 | 9/2011 | Yamagishi et al. |
| 8,058,135 B2 | 11/2011 | Merker et al. |
| 8,097,721 B2 | 1/2012 | Armstrong et al. |
| 8,101,601 B2 | 1/2012 | Lerchen et al. |
| 8,153,029 B2 * | 4/2012 | Hsu .................... 252/500 |
| 8,313,538 B2 | 11/2012 | Merker et al. |
| 8,339,769 B2 | 12/2012 | Schott et al. |
| 8,339,770 B2 * | 12/2012 | Yoshida et al. ............ 361/525 |
| 8,472,165 B2 * | 6/2013 | Ning et al. ............ 361/525 |
| 8,644,006 B2 * | 2/2014 | Hwang et al. ............ 361/532 |
| 2003/0215571 A1 | 11/2003 | Tahon et al. |
| 2005/0065352 A1 | 3/2005 | Brassat et al. |
| 2007/0139862 A1 | 6/2007 | Tateishi et al. |
| 2009/0296317 A1 | 12/2009 | Naoi et al. |
| 2009/0310285 A1 | 12/2009 | Reuter et al. |
| 2009/0320771 A1 | 12/2009 | Torres, Jr. et al. |
| 2010/0084600 A1 | 4/2010 | Ahmad et al. |
| 2010/0148124 A1 | 6/2010 | Reuter et al. |
| 2012/0147528 A1 | 6/2012 | Biler et al. |
| 2012/0147529 A1 | 6/2012 | Biler et al. |

FOREIGN PATENT DOCUMENTS

| | | |
|---|---|---|
| WO | WO 2009030615 | 3/2008 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |

OTHER PUBLICATIONS

Article—Rudge et al., "Conducting Polymers as Active Materials in Electrochemical Capacitors," Journal of Power Sources, vol. 47, 1994, pp. 89-107 (38 pages).

Paper—Aldissi et al., "Conducting Polymers in Ultracapacitor Applications,"Presented at Conference Proceedings at ANTEC '98, Atlanta, Georgia, Apr. 26-Apr. 30, 1998, 6 pages.

Paper—Evans, David A., "High Eneray Density Electrolytic-Electrochemical Hybrid Capacitor," Presented at 14th Capacitor and Resistor Technology Symposium , Mar. 22, 1994, and in CARTS' 1994 Proceedings.

Abstract of Article—Lee et al., "Electro-Conductive properties of poly(3,4-ethylenedioxythiophene)/poly(ionic liquid) films with respect to its structure and morphology," Synthetic Metal, vol. 159, Issues 23-24, Dec. 2009, pp. 2453-2457.

Abstract of Article—Pozo-Gonzalo et al., "PEDOT:Poly(1-vinyl-3-ethylimidazolium) dispersions as alternative materials for optoelectronic devices," Journal of Polymer Science, Part A: Polymer Chemistry, vol. 46, Issue 9, May 1, 2008 (Mar. 24, 2008), pp. 3150-3154.

Article—Cutler et al., "Alkoxysulfonate-Functionalized PEDOT Polyelectrolyte Multilayer Films: Electrochromic and Hole Transport Materials,"Macromolecules, vol. 38, No. 8, 2005, pp. 3068-3074.

Article—Groenendaal et al., "Poly(3,4-ethylenedioxythiophene) and Its Derivatives: Past, Present, and Future," Advanced Materials, vol. 12, No. 7, 2000, pp. 481-494.

Article—Kim et al., "Poly(3,4-ethylenedioxyth Derived from Poly(ionic liquid) for the Use as Hole-Injecting Material in Organic Light-Emitting Diodes," Macromolecular Rapid Comrhunications, vol. 30, 2009, pp. 1477-1482.

(56) References Cited

OTHER PUBLICATIONS

Article—Hain et al., "Electric Conductance of Films Prepared from Polymeric Composite Nanoparticles," Marcromol. Symp., vol. 268, 2008, pp. 61-65.

Article—Stephan et al., "Electrochemical behaviour of 3,4-ethylenedioxythiophene functionalized by a sulphonate group. Application to the preparation of poly(3,4-ethylenedioxythiophene) having permanent cation-exchange properties," Journal of Electroanalytical Chemistry, vol. 443, 1998, pp. 217-226.

Article—Tran-Van et al., "Sulfonated polythiophene and poly(3,4-ethylenedioxythiophene) derivatives with cations exchange properties," Synthetic Metals, vol. 142, 2004, pp. 251-258.

Article—Neil Winterton, "Solubilization of polymers by ionic liquids," J. Mater. Chem., vol. 16, 2006, pp. 4281-4293.

Article—Zotti et al., "Electrochemical and Chemical Synthesis and Characterization of Sulfonated Poly(3,4-ethylenedioxythiophene): Water-Soluble and Highly Conductive Conjugated Oligomer," Macromol. Chem. Phys., vol. 203, No. 13, 2002, pp. 1958-1964.

Product Information from Strem Chemicals, Inc. on Ionic Liquids, 2008, 2 pages.

Thesis—Jennifer Nicole DeCerbo, 1-Alkyl-3-Methylimidazolium Bis(pentafluoroethylsulfonyl)imide Based Ionic Liquids: A Study of Their Physical and Electrochemical Properties, Wright State University, 2008, 12 pages.

Related U.S. Patent Applications.

* cited by examiner

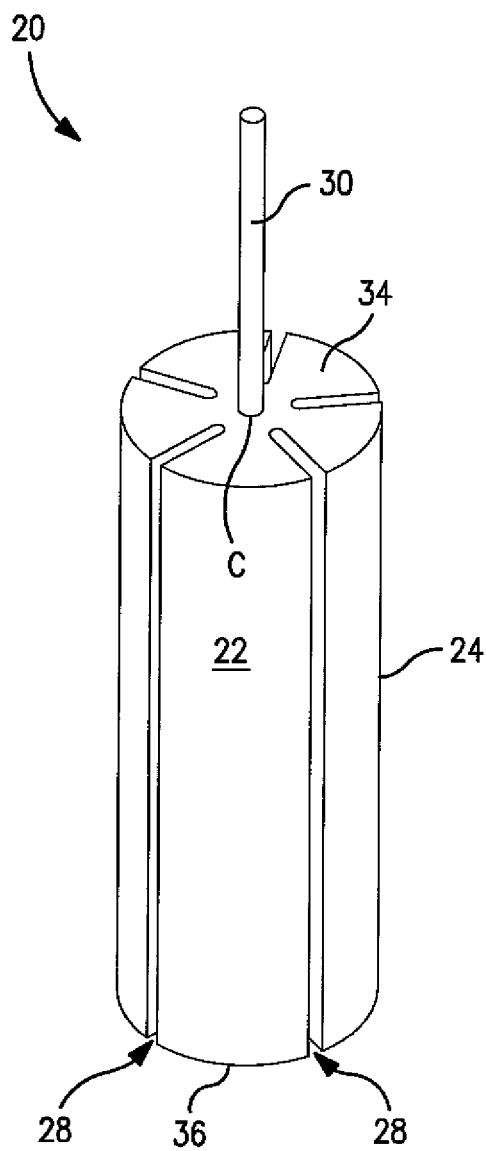
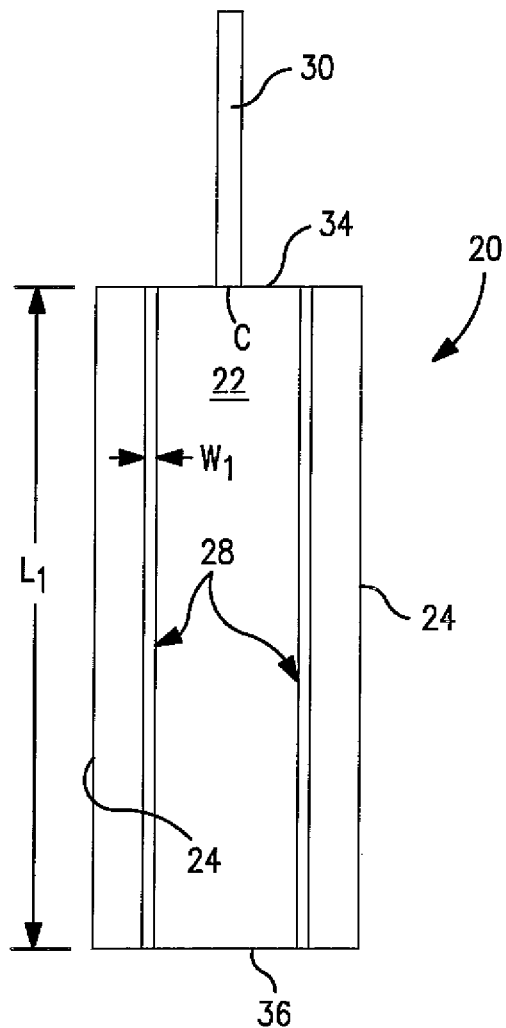
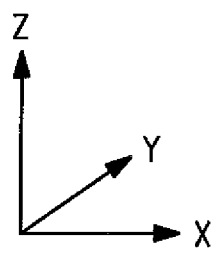
FIG. 2
FIG. 3

WET CAPACITOR CATHODE CONTAINING AN ALKYL-SUBSTITUTED POLY(3,4-ETHYLENEDIOXYTHIOPHENE)

RELATED APPLICATION

The present application claims priority to U.S. Provisional Application Ser. No. 61/611,724, filed on Mar. 16, 2012, which is incorporated herein in its entirety by reference thereto.

BACKGROUND OF THE INVENTION

Wet capacitors are increasingly being used in the design of circuits due to their volumetric efficiency, reliability, and process compatibility. Wet capacitors typically have a larger capacitance per unit volume than certain other types of capacitors, making them valuable in high-current, high power and low-frequency electrical circuits. One type of wet capacitor that has been developed is a wet electrolytic capacitor that includes a valve metal anode, a cathode, and a liquid electrolyte. The unit cell voltage in this type of capacitor is generally higher due to the formation of a dielectric metal oxide film over the anode surface. Wet electrolytic capacitors containing a dielectric from a valve metal tend to offer a good combination of high capacitance with low leakage current. Another type of wet capacitor is a wet symmetric capacitor in which the anode and cathode are similar in terms of structure and composition. The unit cell voltage in this type of capacitor is generally low due to the inevitable decomposition of the electrolyte at high voltage. Whether electrolytic or symmetric, however, the cathodes of wet capacitors have typically included a metal substrate and a conductive coating that provides protection from the liquid electrolyte. Capacitance of the conductive coating is measured through either a faradic current, e.g. electrochemical process or non-faradic mechanism (e.g. double layer formation). Conventional coatings include activated carbon, metal oxides (e.g., niobium dioxide), and the like. Unfortunately, however, the coatings are expensive and can become easily detached under certain conditions.

As such, a need remains for a wet electrolytic capacitor that possesses good thermal, mechanical robustness and electrical performance.

SUMMARY OF THE INVENTION

In accordance with one embodiment of the present invention, a wet electrolytic capacitor is disclosed that comprises an anode, cathode, and fluid working electrolyte in communication with the anode and cathode. The anode comprises a sintered porous anode body that is coated with a dielectric. The cathode comprises a metal substrate over which is disposed a conductive polymer coating. The conductive polymer coating contains an alkyl-substituted poly(3,4-ethylenedioxythiophene) having the following general structure:

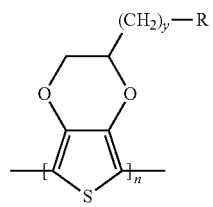

wherein,
n is from 1 to 2,000;
y is from 1 to 10; and
R is a linear or branched, optionally substituted $C_1$ to $C_{18}$ alkyl radical, optionally substituted $C_5$ to $C_{12}$ cycloalkyl radical, optionally substituted $C_6$ to $C_{14}$ aryl radical, optionally substituted $C_7$ to $C_{18}$ aralkyl radical, optionally substituted $C_1$ to $C_4$ hydroxyalkyl radical, hydroxyl radical, or a combination thereof.

In accordance with another embodiment of the present invention, a wet electrolytic capacitor is disclosed that comprises an anode containing a generally cylindrical, sintered porous anode body that is coated with a dielectric, the anode body containing tantalum. The anode further comprises an anode lead wire that extends from a proximal end of the anode in the longitudinal direction. The capacitor also comprises a fluid working electrolyte and a generally cylindrical metal casing within which the anode and the fluid electrolyte are positioned. A conductive polymer coating is disposed on the metal casing so that the coating is in communication with the fluid electrolyte. The conductive polymer coating contains an alkyl-substituted poly(3,4-ethylenedioxythiophene) having the following general structure:

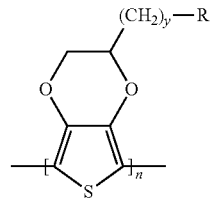

In accordance with yet another embodiment of the present invention, a method for forming a cathode of a wet capacitor is disclosed. The method comprises applying a colloidal suspension to a metal substrate, wherein the colloidal suspension comprises an alkyl-substituted 3,4-ethylenedioxythiophene precursor monomer, surfactant, and a solvent. The precursor monomer is an alkyl-substituted 3,4-ethylenedioxythiophene having the following general structure:

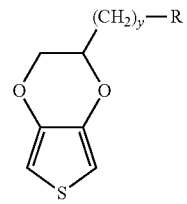

An electrode is placed in contact with the metal substrate and a current feed is supplied to the electrode to induce electrolysis and oxidative polymerization of the precursor monomer, thereby forming a conductive polymer coating that contains an alkyl-substituted poly(3,4-ethylenedioxythiophene).

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 2 is a perspective view of one embodiment of an anode that may be employed in the wet electrolytic capacitor;

FIG. 3 is a side view of the anode of FIG. 2; and

DETAILED DESCRIPTION OF REPRESENTATIVE EMBODIMENTS

Figure 1:
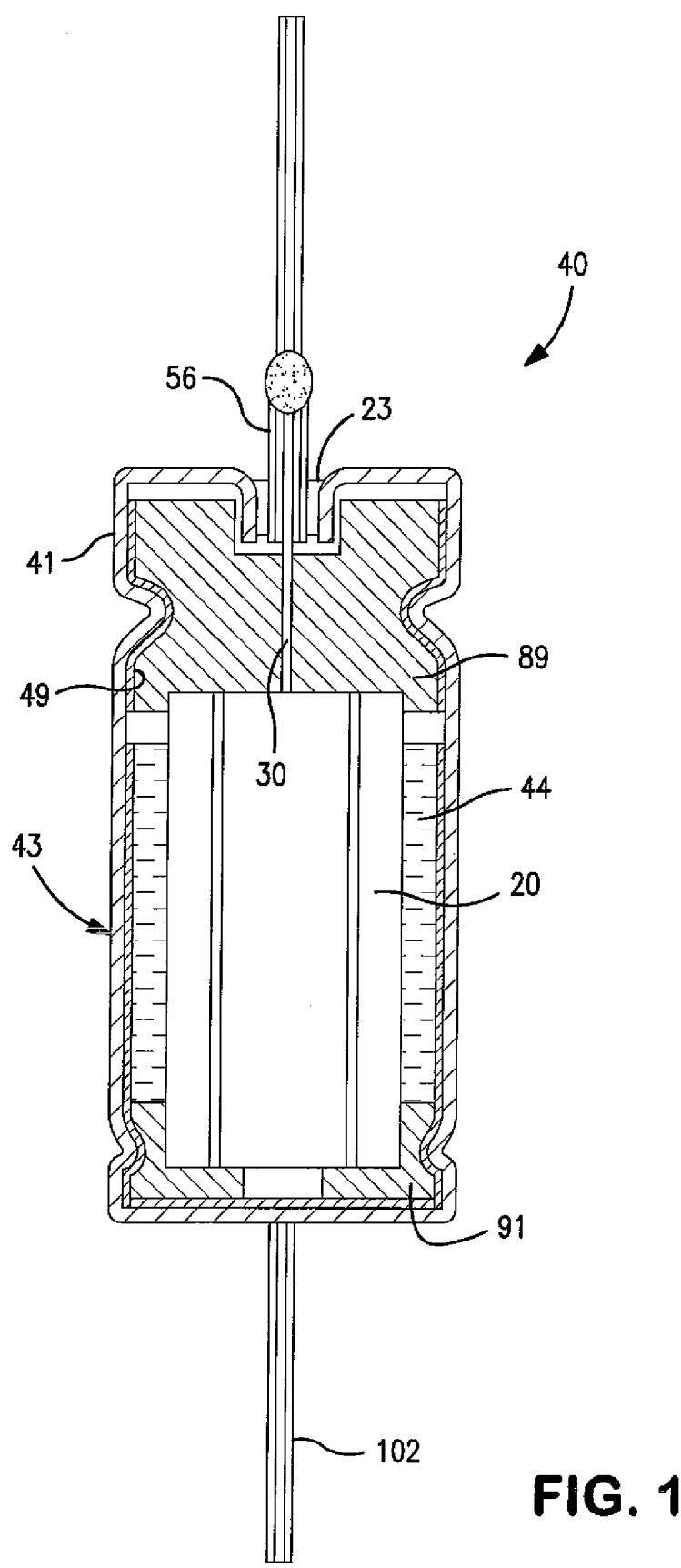
FIG. 1 is a cross-sectional view of one embodiment of the wet electrolytic capacitor of the present invention.

It is to be understood by one of ordinary skill in the art that the present discussion is a description of exemplary embodiments only, and is not intended as limiting the broader aspects of the present invention, which broader aspects are embodied in the exemplary construction.

Repeat use of reference characters in the present specification and drawings is intended to represent same or analogous features or elements of the invention.

The present invention generally relates to a wet electrolytic capacitor that contains an anodically oxidized porous anode body, a cathode containing a metal substrate coated with a conductive coating, and a working electrolyte that wets the dielectric on the anode. The conductive coating contains an alkyl-substituted poly(3,4-ethylenedioxythiophene) having a certain structure. The present inventors have surprisingly discovered that such polymers can result in a higher degree of capacitance than found with many conventional types of coating materials. Further, because the polymers are generally semi-crystalline or amorphous, they can dissipate and/or absorb the heat associated with the high voltage. This in turn prevents fluid electrolyte phase transitions (from liquid to gas) at the interface. The degree of surface contact between the conductive coating and the surface of the metal substrate may also be enhanced in the present invention by selectively controlling the manner in which the conductive coating is formed.

Various embodiments of the present invention will now be described in more detail.

I. Cathode

A. Metal Substrate

The substrate may be include a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium and tantalum, as well as alloys thereof, are particularly suitable for use in the present invention. The geometric configuration of the substrate may generally vary as is well known to those skilled in the art, such as in the form of a container, can, foil, sheet, screen, mesh, etc. In one embodiment, for example, the metal substrate forms a casing having a generally cylindrical shape. It should be understood, however, that any geometric configuration may be employed in the present invention, such as D-shaped, rectangular, triangular, prismatic, etc. The casing may optionally include a lid that covers the anode and electrolyte, which may be formed from the same or different material than the casing.

If desired, the substrate may be roughened to increase its surface area and increase the degree to which the conductive polymer may be able to adhere thereto. In one embodiment, for example, the surface is chemically etched, such as by applying a solution of a corrosive substance (e.g., hydrochloric acid) to the surface. The surface may also be electrochemically etched, such as by applying a voltage to a solution of the corrosive substance so that it undergoes electrolysis. The voltage may be raised to a sufficiently high level to initiate "sparking" at the surface of the substrate, which is believed to create high local surface temperatures sufficient that etches away the substrate. This technique is described in more detail in U.S. Patent Application Publication No. 2010/0142124 to Dreissig, et al. In addition to chemical or electrochemical roughening techniques, mechanical roughening may also be employed. In one embodiment, for instance, the surface of the metal substrate may be abrasive blasted by propelling a stream of abrasive media (e.g., sand) against at least a portion of a surface thereof.

B. Conductive Coating

As indicated above, the conductive coating contains an alkyl-substituted poly(3,4-dioxyethylenethiopene). The alkyl-substituted polymer may form a homopolymer, or may be one polymeric constituent of a copolymer that contains one or more other types of polymeric constituents. Regardless, the alkyl-substituted poly(3,4-dioxyethylenethiopene) has the following general structure:

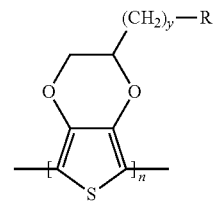

wherein, n is from 1 to 2,000, in some embodiments from 2 to 500, and in some embodiments, from 4 to 350;

y is from 1 to 10, in some embodiments from 1 to 5, in some embodiments, from 1 to 3, and in some embodiments, from 1 to 2 (e.g., 2); and R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical; hydroxyl radical; or a combination thereof. Examples of substituents for the radicals "R" include, for instance, hydroxyl, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth. It should be understood that other "R" group(s) may also be bonded to one or more other the carbon atoms of the ring system.

In particular embodiments, the alkyl-substituted poly(3,4-ethylenedioxythiophene) has the following general structure:

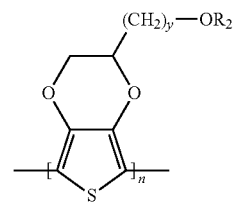

wherein, n and y are as defined above; and $R_2$ is hydrogen or an alkyl group. Particular examples of such polymers include hydroxyethylated poly(3,4-ethylenedioxythiophene) (y is 2 and $R_2$ is H) and hydroxymethylated poly(3,4-ethylenedioxthiophene) (y is 1 and $R_2$ is H).

Any of a variety of different techniques may be employed to form the polymer. In one embodiment, for example, a precursor monomer may be chemically polymerized on the metal substrate in the presence of an oxidative catalyst. The precursor monomer may be an alkyl-substituted 3,4-ethylenedioxythiophene having the following general structure:

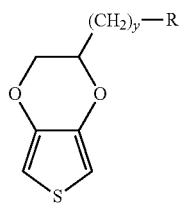

wherein, y and R are as defined above. More particularly, the precursor monomer may have the following structure:

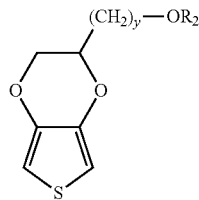

wherein, y and $R_2$ are as defined above. Particular examples of such monomers include hydroxyethylated 3,4-ethylenedioxythiophene (y is 2 and $R_2$ is H) and hydroxymethylated 3,4-ethylenedioxythiophene (y is 1 and $R_2$ is H).

The oxidative catalyst employed during chemical polymerization may include a transition metal cation, such as iron (III), copper(II), chromium(VI), cerium(IV), manganese (IV), manganese(VII), ruthenium(III) cations, etc. A dopant may also be employed to provide excess charge to the conductive polymer and stabilize the conductivity of the polymer. The dopant may include an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from H.C. Starck GmbH under the designation Clevios™ C.

Various methods may be utilized to form the conductive coating on the metal substrate. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a conductive polymer coating. As an example, a monomer may initially be mixed with the oxidative catalyst to form a precursor solution. Once the mixture is formed, it may be applied to the metal substrate and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The substrate may then be dried to remove the solvent therefrom. Thereafter, the substrate may be dipped into a solution containing the monomer. Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler.

While chemical polymerization techniques may be employed in certain embodiments, it is often desired to minimize the use of oxidative catalysts in the capacitor as such materials can often lead to the formation of iron radicals (e.g., $Fe^{2+}$ or $Fe^{3+}$ ions). These radicals can, in turn, lead to dielectric degradation at the high voltages often employed during the use of the wet capacitor. Thus, anodic electrochemical polymerization techniques may be employed in certain embodiments to form the alkyl-substituted poly(3,4-ethylenedioxythiophene). Such techniques generally employ a colloidal suspension that is generally free of iron-based oxidative catalysts. For instance, the colloidal suspension typically contains less than about 0.5 wt. %, in some embodiments, less than about 0.1 wt. %, and in some embodiments, less than about 0.05 wt. % (e.g., 0 wt. %) of such iron-based oxidative catalysts.

The colloidal suspension may be in the form of a macroemulsion, microemulsion, solution, etc. depending on the particular nature of the components of the suspension. Regardless, the suspension generally contains a solvent that serves as a continuous phase within which the precursor monomer is dispersed. Any of a variety of different solvents may be employed in the colloidal suspension, such as alcohols, glycols, water, etc. In one particular embodiment, the colloidal suspension is aqueous in nature. Solvents (e.g., water) may constitute from about 50 wt. % to about 99 wt. %, in some embodiments from about 70 wt. % to about 98 wt. % and in some embodiments, from about 80 wt. % to about 95 wt. %. The remaining components of the colloidal suspension (e.g., precursor monomers, surfactants, and sulfonic acids) may likewise constitute from about 1 wt. % to about 50 wt. %, in some embodiments from about 2 wt. % to about 30 wt. % and in some embodiments, from about 5 wt. % to about 20 wt. % of the colloidal suspension.

A surfactant may be employed in the colloidal suspension to form micelles that lead to an increase in solubility, forming a macroscopically or microscopically homogenous distribution of these micelles and the precursor monomer. The surfactant may be ionic (e.g., anionic, cationic, or zwitterionic) or nonionic in nature. The ionic surfactant may, for instance, be an anionic surfactant, such as a sulfonate (e.g., alkyl arylene sulfonates, α-olefin sulfonates, β-alkoxy alkane sulfonates, alkylauryl sulfonates, alkyl monoglyceride sulfonates, alkyl ether sulfonates, etc.); sulfate (e.g., alkyl sulfates, alkyl aryl sulfates, alkyl ether sulfates, alkyl monoglyceride sulfates, etc.); sulfosuccinate; sarcosinate; etc., as well as derivatives, salts, polymers, and/or mixtures of the foregoing. Particular examples of ionic surfactants include, but are not limited to, $C_8$-$C_{30}$ alkyl sulfates, $C_8$-$C_{30}$ alkyl ether sulfates having one or two moles of ethoxylation, $C_8$-$C_{30}$ alkoyl sarcosinates, $C_8$-$C_{30}$ sulfoacetates, $C_8$-$C_{30}$ sulfosuccinates, $C_8$-$C_{30}$ alkyl diphenyl oxide disulfonates, $C_8$-$C_{30}$ alkyl carbonates, $C_8$-$C_{30}$ arylene sulfonates, etc. The $C_8$-$C_{30}$ alkyl group may be straight chain (e.g., dodecyl) or branched (e.g., 2-ethylhexyl). The cation of the ionic surfactant may be a proton, alkali metal (e.g., sodium or potassium), ammonium, $C_1$-$C_4$ alkylammonium (e.g., mono-, di-, tri-), or $C_1$-$C_3$ alkanolammonium (e.g., mono-, di-, tri). In one particular embodiment, for example, the anionic surfactant may be an alkyl benzenesulfonate having the following general structure:

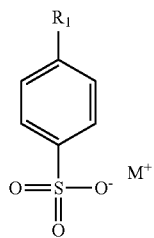

wherein, $R_1$ is an alkyl group having from 8 to 30 carbon atoms, in some embodiments from 9 to 20, and in some embodiments, from 10 to 14 (e.g., 12) carbon atoms; and M is cation, such as hydrogen, a metal (e.g., sodium, potassium, lithium, etc.), ammonia ($NH_4^+$), etc. Comparable compounds with a naphthalene nucleus also can be used to form alkyl naphthalenesulfonates. Without intending to be limited by theory, it is believed that such alkyl arylene sulfonates are particularly effective in enhancing the surface coverage of the colloidal suspension on the substrate while also facilitating charge transport.

Of course, in addition to or in lieu of an anionic surfactant, cationic surfactants and/or zwitterionic surfactants may also be employed. Examples of cationic surfactants may include amino acids, alkyl amine salts, quaternary ammonium salts, pyridium salts, etc. For instance, suitable alkyl amine salts may include salts of primary or secondary amines having 3 to 22 carbon atoms, and carboxylic acid having 1 to 22 carbon atoms or inorganic mineral acid, such as dodecylamine acetate salt, dodecylamine hydrochloride salt, dodecylamine stearate salt, dodecylamine sulfonate, dimethylamine stearate salt, etc. In certain embodiments, such cationic surfactants may be formed in situ within the colloidal suspension through the addition of an amine (e.g., dodecylamine) and an acid, such as a sulfonic acid described below (e.g., toluene sulfonic acid).

Nonionic surfactants may also be employed. Such surfactants typically have a hydrophobic base, such as a long chain alkyl group or an alkylated aryl group, and a hydrophilic chain containing a certain number (e.g., 1 to about 30) of ethoxy and/or propoxy moieties. Although not necessarily require, nonionic surfactants having a certain hydrophilic/lipophilic balance ("HLB") value may help improve the stability of the colloidal suspension. The HLB index is well known in the art and is a scale that measures the balance between the hydrophilic and lipophilic solution tendencies of a compound with lower numbers representing highly lipophilic tendencies and the higher numbers representing highly hydrophilic tendencies. In some embodiments of the present invention, the HLB value of the nonionic surfactant is from about 5 to about 20, in some embodiments from about 10 to about 19 and in some embodiments, from about 11 to about 18. If desired, two or more surfactants may be employed that have HLB values either below or above the desired value, but together have an average HLB value within the desired range.

Suitable nonionic surfactants may include, for instance, polyoxyethylene chains as hydrophilic groups, polyglycerol fatty acid esters, polyglycerol fatty alcohol ethers, sucrose fatty acid esters, and hydrocarbyl polyglycosides. In one embodiment, the nonionic surfactant includes polyoxyethylene chains as hydrophilic groups and is selected from the group of polyoxyethylene fatty acid esters, polyoxyethylene fatty alcohol ethers, polyoxyethylene sorbitol anhydride fatty acid esters, polyoxyethylene glycerol mono fatty acid esters, polyoxyethylene hydrogenated castor oil and polyoxyethylene hydrogenated castor oil mono fatty acid esters, etc., as well as combinations thereof. Particularly suitable are polyoxyethylene fatty alcohol ethers in which the fatty alcohol forming the polyoxyethylene fatty alcohol ether is saturated or unsaturated, and has 8 to 22 carbon atoms (e.g., 8 to 14), and the polyoxyethylene structure moiety contains on average 4 to 60 ethylene oxide repeating units (e.g., 4 to 12). Examples of such surfactants include polyoxyethylene octyl ethers (e.g., polyoxyethylene-5 octyl ether), polyoxyethylene decyl ethers, polyoxyethylene lauryl ethers (e.g., polyoxyethylene-8 lauryl ether or polyoxyethylene-10-lauryl ether), polyoxyethylene myristyl ethers, polyoxyethylene palmityl ethers, polyoxyethylene isostearyl ethers, polyoxyethylene stearyl ethers, polyoxyethylene oleyl ethers, polyoxyethylene behenyl ethers, etc.

Regardless of its particular form, the surfactant can facilitate the formation of a colloidal suspension of precursor monomer droplets. Without intending to be limited by theory, it is believed that such droplets can result in the formation of relatively small polymer units on the surface of the cathode substrate during anodic electrochemical polymerization. Such smaller polymer units can, in turn, result in a coating that is substantially uniform with excellent surface coverage. The size of the droplets depends in part on the nature of the suspension. "Microemulsions", for instance, may contains droplets having an average diameter of about 5 micrometers or less, in some embodiments about 4 micrometers or less, in some embodiments from about 10 nanometers to about 2 micrometers, and in some embodiments, from about 20 nanometers to about 1 micrometer. "Macroemulsions" may likewise contain droplets having a size of from about 5 to about 100 micrometers, and in some embodiments, from about 10 to about 80 micrometers. The term "diameter" can refer to the "hydrodynamic equivalent diameter" of a particle as determined using known techniques, such as photon correlation spectroscopy, dynamic light scattering, quasi-elastic light scattering, etc. These methods are generally based on the correlation of particle size with diffusion properties of particles obtained from Brownian motion measurements. Brownian motion is the random movement of the particles due to bombardment by the solvent molecules that surround the particles. The larger the particle, the more slowly the Brownian motion will be. Velocity is defined by the translational diffusion coefficient. The measured particle size value thus relates to how the particle moves within a liquid and is termed the "hydrodynamic diameter." Various particle size analyzers may be employed to measure the diameter in this manner. One particular example is a Cordouan VASCO 3 Particle Size Analyzer.

To help achieve the desired improvement in the surface coverage of the precursor monomer, it is also generally desired that the concentration of the surfactant is selectively controlled within a certain range relative to the precursor monomer. For example, the ratio of the weight of surfactants to the weight of precursor monomers within the colloidal suspension may be from about 0.5 to about 1.5, in some embodiments from about 0.6 to about 1.4, and in some embodiments, from about 0.8 to about 1.2. Surfactants may, for instance, constitute from about 0.2 wt. % to about 10 wt. %, in some embodiments from about 0.5 wt. % to about 8 wt. %, and in some embodiments, from about 1 wt. % to about 5 wt. % of the colloidal suspension. The total concentration of monomers employed in the colloidal suspension may also be from about 0.1 wt. % to about 15 wt. %, in some embodiments from about 0.4 wt. % to about 10 wt %, and in some embodiments, from about 0.5 wt. % to about 5 wt. % by weight of the colloidal suspension.

The colloidal suspension may also contain a sulfonic acid that can act as a secondary dopant to provide excess charge to the conductive polymer and stabilize its conductivity. Such acids may, for example, result in a colloidal suspension that has an electrical conductivity of from about 1 to about 100 milliSiemens per centimeter ("mS/cm"), in some embodiments from about 5 to about 60 mS/cm, and in some embodiments, from about 15 to about 50 mS/cm, determined at a temperature of 23° C. using any known electric conductivity meter (e.g., Oakton Con Series 11). The nature of the sulfonic acid, as wells as its relative concentration, may also be selectively controlled so that the pH level of the colloidal suspension is within a range of from about 2.0 to about 8.5, in some embodiments from about 3.0 to about 8.0, and in some embodiments, from about 5.0 to about 7.5. For example, the ratio of the weight of sulfonic acids to the weight of precursor monomers within the colloidal suspension is from about 0.2 to about 1.2, in some embodiments from about 0.4 to about 1.1, and in some embodiments, from about 0.6 to about 1.0. Likewise, the ratio of the weight of sulfonic acids to the weight of surfactants within the colloidal suspension is from about 0.2 to about 1.2, in some embodiments from about 0.3 to about 0.9, and in some embodiments, from about 0.4 to about 0.8.

The sulfonic acid is typically a low molecular weight organic-based monosulfonic acid, disulfonic acid, or trisulfonic acid. Specific examples of such acids include, for instance, alkylsulfonic acids (e.g., 2-acrylamide-2-methylpropanesulfonic acid, etc.); arylene sulfonic acids, such as benzenesulfonic acids (e.g., phenolsulfonic acid, styrenesulfonic acid, p-toluenesulfonic acid, dodecylbenzenesulfonic acid, etc.) and naphthalenesulfonic acids (e.g., 1-naphthalenesulfonic acid, 2-naphthalenesulfonic acid, 1,3-naphthalenedisulfonic acid, 1,3,6-naphthalenetrisulfonic acid, 6-ethyl-1-naphthalenesulfonic acid, etc.); anthraquinonesulfonic acids (e.g., anthraquinone-1-sulfonic acid, anthraquinone-2-sulfonic acid, anthraquinone-2,6-disulfonic acid, 2-methylanthraquinone-6-sulfonic acid, etc.); camphorsulfonic acids, as well as derivatives and mixtures thereof. Arylene sulfonic acids are particularly suitable for use in the colloidal suspension, such as 1-naphthalenesulfonic acid, 2-naphthalenesulfonic acid, and/or p-toluenesulfonic acid.

It should be understood that the term "safonic acid" as used herein also encompass salts of acids, such as those noted above, which can dissociate in an aqueous solution, such as sodium salts, lithium salts, potassium salts, etc. In one embodiment, for example, the sulfonic acid may be a sodium or potassium salt of 1-naphthalenesulfonic acid, 2-naphthalenesulfonic acid, and/or p-toluenesulfonic acid.

In addition to the components noted above, the colloidal suspension may also contain various other additives. For example, a defoaming agent may be employed in certain embodiments to reduce the degree of foam produced by the surfactant during the anodic electrochemical polymerization. Suitable defoaming agents may include, for instance, oils, esters, ethers, glycols, polysiloxanes, long chain oxygenated hydrocarbons (e.g., $C_6$ to $C_{12}$ alcohols), etc., as well as mixtures thereof. Particularly suitable defoaming agents are long chain oxygenated hydrocarbons, such as octanol, decanol and polyethylene glycols. When employed, such defoaming agents may constitute from about 0.01 wt. % to about 5 wt. %, in some embodiments from about 0.05 wt. % to about 4 wt. %, and in some embodiments, from about 0.1 wt. % to about 2 wt. % of the colloidal suspension. Besides defoaming agents, a wide variety of other additives may also be employed in the colloidal suspension.

To apply the colloidal suspension to the metal substrate, any of a variety of suitable application techniques may be employed, such as screen-printing, dipping, electrophoretic coating, spraying, etc. Regardless of how it is applied, the monomer within the colloidal suspension may be anodically electrochemically-polymerized to form a conductive polymer coating on the surface of the metal substrate. In one embodiment, for example, the metal substrate is dipped into a bath containing the colloidal suspension of the present invention. A pair of electrodes may be disposed within the bath for electrolysis. One electrode may be connected to the positive terminal of a power source and also in contact with the metal substrate. The other electrode may be connected to the negative terminal of the power source and an additional inert metal. During operation, the power source supplies a current feed to the electrodes in the electrochemical cell, thereby inducing electrolysis of the electrolyte and oxidative polymerization of the monomer in the colloidal suspension, or solution, onto the metal substrate. Anodic electrochemical polymerization is generally performed at ambient temperature to ensure that the colloidal suspension does not phase separate. For example, the colloidal suspension may be kept at a temperature of from about 15° C. to about 80° C., in some embodiments from about 20° C. to about 75° C., and in some embodiments, from about 25° C. to about 50° C. The amount of time in which the metal substrate is in contact with the colloidal suspension during anodic electrochemical polymerization may vary. For example, the metal substrate may be dipped into such a solution for a period of time ranging from about 10 seconds to about 10 minutes.

Regardless of the type of polymerization employed (e.g., chemical and/or anodic electrochemical), multiple polymerization steps may be repeated until the desired thickness of the coating is achieved. In one embodiment, for example, a chemically polymerized layer may be disposed directly on the metal substrate and an electrochemical polymerized layer may be disposed thereover, or vice versa. Regardless, the total target thickness of the coating may generally vary depending on the desired properties of the capacitor. Typically, the resulting conductive polymer coating has a thickness of from about 0.2 micrometers ("μm") to about 50 μm, in some embodiments from about 0.5 µm to about 20 µm, and in some embodiments, from about 1 µm to about 5 µm. It should be understood that the thickness of the coating is not necessarily the same at all locations on the substrate. Nevertheless, the average thickness of the coating on the substrate generally falls within the ranges noted above.

II. Anode

The anode may include a sintered porous body formed from a valve metal composition. The valve metal composition may contain a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). In certain cases, the powder may have a low specific charge to optimize the ability to grow a thick dielectric layer that is capable of withstanding high operational voltages. That is, the powder may have a specific charge of less than about 20,000 microFarads*Volts per gram ("µF*V/g"), in some embodiments about 1,000 µF*V/g to about 20,000 µF*V/g, and in some embodiments, from about 2,000 to about 15,000 µF*V/g. However, powders having a relatively high specific charge can also be employed. For example, such high specific charge powders may have a specific charge of from about 20,000 to about 450,000 µF*V/g, in some embodiments from about 30,000 to about 350,000 µF*V/g or more, in some embodiments from about 40,000 to about 300,000 µF*V/g, and in some embodiments, from about 50,000 to about 200,000 µF*V/g.

The powder may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Such powders may be agglomerated, such as through one or multiple heat treatment steps in an inert or reducing atmosphere. The powder may also be subjected to various other optional techniques as is known in the art, such as milling, deoxidation, leaching, doping, etc.

The powder may also be mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methyl-hydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using a powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

After compaction, any binder/lubricant may be removed using a variety of different techniques. In certain embodiments, for example, the pellet is heated under vacuum pressure at a certain temperature (e.g., from about 150° C. to about 500° C.) for several minutes to drive off the binder/lubricant. The pellet may also be washed with a liquid solution (e.g., aqueous solution) to help assist in the removal of the binder/lubricant, such as described in U.S. Pat. No. 6,197,252 to Bishop, et al., which is incorporated herein in its entirety by reference thereto for all purposes.

Once formed, the anode body may then be sintered. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Figure 4:
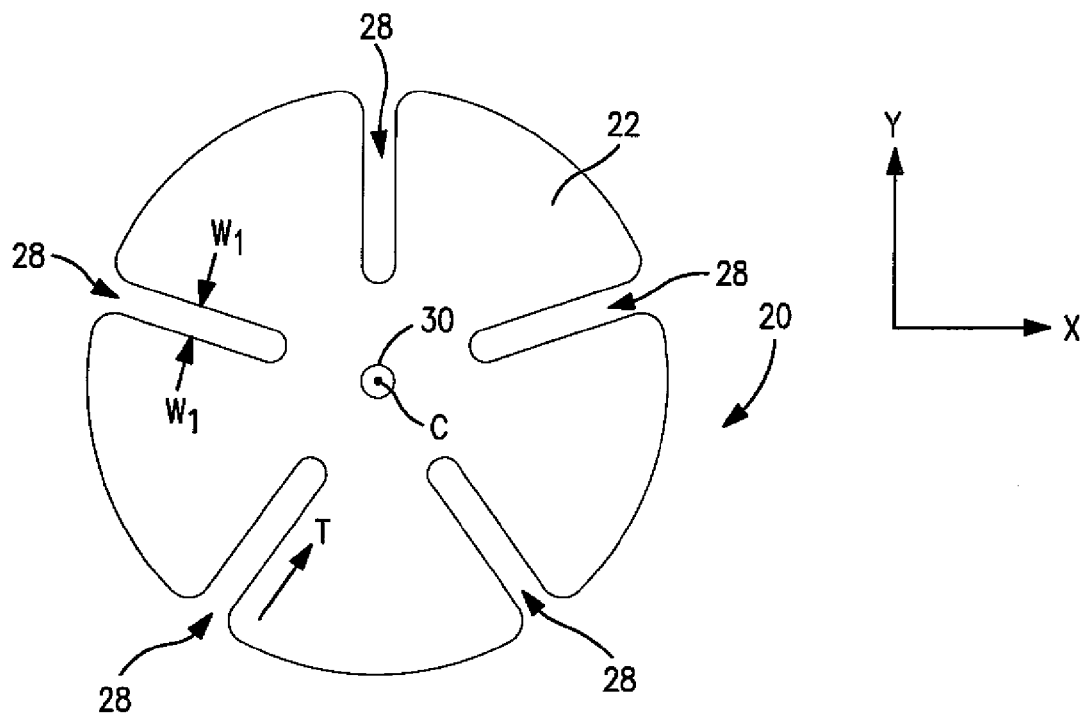
FIG. 4 is a top view of the anode of FIG. 2.

Referring to FIGS. 2-4, for example, one embodiment of an anode 20 is shown that contains a porous, sintered body 22 having at least one sidewall 24 positioned between a proximal end 34 and an opposing distal end 36. The cross-sectional shape of the proximal end 34 and/or the distal end 36 may generally vary based on the desired shape of the anode body 22. In this particular embodiment, for example, both ends 34 and 36 have a circular cross-sectional shape such that the anode body 22 is generally cylindrical. Other suitable shapes may include, for instance, square, rectangular, triangular, hexagonal, octagonal, heptagonal, pentagonal, trapezoidal, elliptical, star, sinusoidal, etc. The anode body 22 also has a length in the longitudinal direction "z" defined between the ends 34 and 36, and a width in the "x" direction and depth in the "y" direction. In the illustrated embodiment, the width and depth are both defined between the sidewalls 24. Although by no means a requirement, the length of the anode body 22 is typically greater than its width and/or depth. For example, in certain embodiments, the ratio of the length to both the width and depth may be from about 1 to about 30, in some embodiments from about 1.1 to about 10, and in some embodiments, from about 1.5 to about 5. The length of the anode 20 may, for example, range from about 0.5 to about 106 millimeters, in some embodiments from about 1 to about 60 millimeters, and in some embodiments, from about 5 to about 30 millimeters. The width of the anode body 22 may range from about 0.5 to about 50 millimeters, in some embodiments from about 1 to about 40 millimeters, and in some embodiments, from about 4 to about 30 millimeters. Likewise, the depth of the anode body 22 may range from about 0.5 to about 50 millimeters, in some embodiments from about 1 to about 40 millimeters, and in some embodiments, from about 4 to about 30 millimeters. Of course, when the anode body is cylindrical in nature, its width and depth will be the same.

In certain embodiments, at least one longitudinally extending channel is recessed into the anode body. Such channels may be formed during pressing as would be known to those skilled in the art. For example, the press mold may contain one or more longitudinal indentations that correspond to the desired shape of the channels. In this manner, the powder is compressed around the indentations so that when removed from the mold, the resulting anode body contains longitudinal channels at those areas where the longitudinal indentations were located in the mold.

Figure 5:
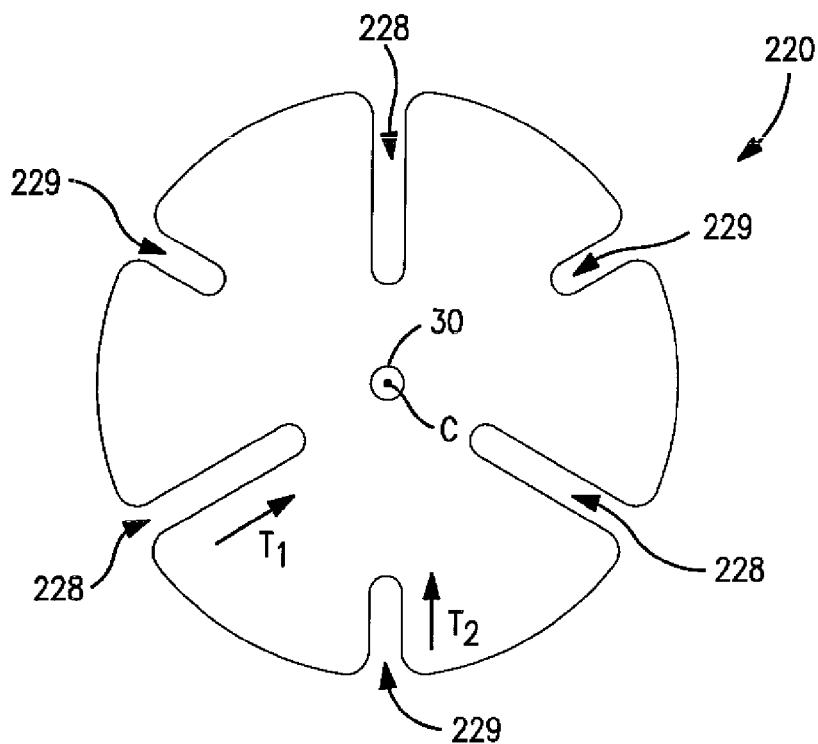
FIG. 5 is a top view of another embodiment of an anode that may be employed in the wet electrolytic capacitor of the present invention.

The channels may have a relatively high aspect ratio (length divided by width), such as about 2 or more, in some embodiments about 5 or more, in some embodiments from about 10 to about 200, in some embodiments from about 15 to about 150, in some embodiments from about 20 to about 100, and in some embodiments, from about 30 to about 60. Such channels can significantly increase the outer surface area of the anode, which may enhance the degree to which the anode can dissipate heat and increase the likelihood that the anodizing electrolyte will pass into the pores of the anode body during anodic oxidation. Referring again to FIGS. 2-4, for instance, the anode body 22 may contain channels 28 that are recessed into the sidewall 24. The channels 28 are "longitudinally extending" in the sense that they possess a length in the longitudinal direction "z" of the anode body 22. However, while the channels 28 of FIGS. 2-4 are substantially parallel with the longitudinal direction, this is by no means a requirement. For example, other suitable embodiments may include one or more longitudinally extending channels that are in the form of a spiral, helix, etc., which are not parallel with the longitudinal of the anode body. The number of such longitudinally extending channels may vary, but is typically from 1 to 20, in some embodiments from 2 to 15, and in some embodiments, from 4 to 10. When multiple channels are employed, it is generally desired that they are distributed symmetrically and equidistant about a center longitudinal axis of the anode, although this is by no means a requirement. In FIGS. 2-4, for example, the depicted anode body 22 contains five (5) separate channels 28. FIG. 5, on the other hand, shows an alternative embodiment in which six (6) separate channels 228 are employed. In each of the particular embodiments, however, the channels are distributed in a generally symmetric manner about the longitudinal center "C" of the anode body.

At least a portion of the channels 28 may have a relatively high aspect ratio (length divided by width). The length "$L_1$" (FIG. 3) of the channels 28 may, for example, range from about 0.5 to about 100 millimeters, in some embodiments from about 1 to about 60 millimeters, and in some embodiments, from about 5 to about 30 millimeters. The width "$W_1$" of the channels 28 (FIGS. 3 and 4) may likewise range from about 0.01 to about 20 millimeters, in some embodiments from about 0.02 to about 15 millimeters, and in some embodiments from about 0.05 to about 4 millimeters, and in some embodiments, from about 0.1 to about 2 millimeters. The channels 28 shown in FIGS. 2-4 extend in the longitudinal direction "L" along the entire length of the anode body 22 and intersect both the proximal end 34 and the distal end 36. It should be understood, however, that one or more channels may also extend along only a portion of the anode body length so that they intersect only one end of the anode body, or so that they do not intersect either end.

The extent to which the channels are recessed into the anode body may be selectively controlled to achieve a balance between increased surface and integrity of the anode structure. That is, if the depth of the channels is too great, it may be difficult to press the anode into a physically strong structure. Likewise, if the depth is too small, the desired benefits may not be achieved. Thus, in most embodiments, the channels are recessed so that they extend in a direction that is from about 2% to about 60%, in some embodiments from about 5% to about 50%, and in some embodiments, from about 10% to about 45% of the thickness of the anode body in the same direction. Referring again to FIG. 3, for example, one of the channels 28 is shown as extending in a direction "T." In this embodiment, the length of the channel 28 in the direction "T" divided by the thickness of the porous body 22 in the direction "T", multiplied by 100, is within the percentages referenced above.

Of course, the depth of each of the channels need not be the same. Referring to FIG. 5, for example, one embodiment of an anode 220 is shown that contains first channels 228 and second channels 229. In this particular embodiment, the first channels 228 extend into the anode body to a greater degree than the second channels 229. One of the first channels 228 may, for example, extend in a direction "$T_1$" that is from about 15% to about 60%, in some embodiments from about 20% to about 50%, and in some embodiments, from about 25% to about 45% of the thickness of the anode body in the same direction. Likewise, one of the second channels 229 may extend in a direction "$T_2$" that is from about 2% to about 40%, in some embodiments from about 5% to about 35%, and in some embodiments, from about 10% to about 25% of the anode body in the same direction. Such a configuration can effectively combine the benefits of the deeper channels (e.g., greater surface area) with those of the shallower channels (e.g., greater physical integrity). In such embodiments, the number of deeper channels may be from 1 to 10, in some embodiments from 2 to 6, and in some embodiments, from 2 to 4, and the number of shallower channels may likewise be from 1 to 10, in some embodiments from 2 to 6, and in some embodiments, from 2 to 4.

Typically, the anode also contains an anode lead wire that helps connect the anode to the terminations of the resulting capacitor. The lead wire may be formed from any electrically conductive material, such as tantalum, niobium, nickel, aluminum, hafnium, titanium, etc., as well as oxides and/or nitrides of thereof. Although not necessarily required, it is often desired that the lead wire extend in the same longitudinal direction as the channels. In the embodiment of FIGS. 2-4, for example, an anode lead wire 30 extends in the longitudinal "z" direction from the proximal end 34 of the anode body 22. Electrical contact with the anode 20 may be accomplished by in a variety of ways, such as by coupling the lead wire 30 using resistance or laser welding. Alternatively, the lead wire 30 may be embedded into the anode body during its formation (e.g., prior to sintering).

Regardless of whether channels are present, the porous anode body may be anodically oxidized ("anodized") so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt.%, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

III. Working Electrolyte

The working electrolyte is a fluid that may be impregnated within the anode, or it may be added to the capacitor at a later stage of production. The fluid electrolyte generally uniformly wets the dielectric. Various suitable electrolytes are described in U.S. Pat. Nos. 5,369,547 and 6,594,140 to Evans, et al. Typically, the electrolyte is ionically conductive in that has an electrical conductivity of from about 0.1 to about 20 Siemens per centimeter ("S/cm"), in some embodiments from about 0.2 to about 10 S/cm, and in some embodiments, from about 0.5 to about 5 S/cm, determined at a temperature of about 23° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The fluid electrolyte is generally in the form of a liquid, such as a solution (e.g., aqueous or non-aqueous), colloidal suspension, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at about 23° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, glucosic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), a-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. One or more pH adjusters (e.g., acids, bases, etc.) may be employed to help achieve the desired pH. In one embodiment, an acid is employed to lower the pH to the desired range. Suitable acids include, for instance, organic acids such as described above; inorganic acids, such as hydrochloric acid, nitric acid, sulfuric acid, phosphoric acid, polyphosphoric acid, boric acid, boronic acid, etc.; and mixtures thereof. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to abbot 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitro benzoic acid; 3-methyl-2-nitro benzoic acid; 3-methyl-4-nitrobenzoic acid; 3-methyl-6-nitrobenzoic acid; 4-methyl-3-nitro benzoic acid; anhydrides or salts thereof; and so forth.

The particular manner in which the components are incorporated into the capacitor is not critical and may be accomplished using a variety of techniques. Referring to FIG. 1, for example, one embodiment of an electrolytic capacitor 40 is shown that includes a working electrolyte 44 disposed in electrical communication with an anode 20 and a cathode 43. The cathode 43 may be formed from a substrate 41 on which is disposed a conductive coating 49 formed according to the present invention. In the illustrated embodiment, the substrate 41 forms a casing having a generally cylindrical shape. It should be understood, however, that any geometric configuration may be employed in the present invention, such as rectangular, triangular, prismatic, etc. The casing may optionally include a lid that covers the anode and electrolyte, which may be formed from the same or different material than the casing.

A seal 23 (e.g., glass-to-metal) may also be employed that connects and seals the anode 20 to the cathode 43. An electrically insulating bushing 89 (e.g., polytetrafluoroethylene ("PTFE")) and/or support 91 may also be employed to help stabilize the anode 20 and lead 42 and maintain the desired spacing within the capacitor. If desired, a separator (not shown) may also be positioned between the cathode 43 and anode 20 to prevent direct contact between the anode and cathode. Examples of suitable materials for this purpose include, for instance, porous polymer materials (e.g., polypropylene, polyethylene, polycarbonate, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. To optimize the volumetric efficiency of the capacitor, it is generally desired that the separator has a relatively small thickness. For example, the thickness of the separator, when employed, typically ranges from about 5 to about 250 micrometers, in some embodiments from about 10 to about 150 micrometers, and in some embodiments, from about 15 to about 100 micrometers.

The lid or casing may define an internal orifice through which extends a conductive tube 56 that is generally hollow and of a size and shape sufficient to accommodate an anode lead. The conductive tube 56 is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. During and/or after assembly and sealing (e.g., welding), the electrolyte may be introduced into the casing through a fill-port. Filling may be accomplished by placing the capacitor in a vacuum chamber so that the fill-port extends into a reservoir of the electrolyte. When the chamber is evacuated, pressure is reduced inside the capacitor. When the vacuum is released, pressure inside the capacitor re-equilibrates, and the electrolyte is drawn through the fill-port into the capacitor.

Regardless of its particular configuration, the capacitor of the present invention may exhibit excellent electrical properties. For example, the capacitor may exhibit a high volumetric efficiency, such as from about 50,000 $\mu F*V/cm^3$ to about 300,000 $\mu F*V/cm^3$, in some embodiments from about 60,000

μF*V/cm³ to about 200,000 μF*V/cm³, and in some embodiments, from about 80,000 μF*V/cm³ to about 150,000 μF*V/cm³, determined at a frequency of 120 Hz and at room temperature (e.g., 25° C.). Volumetric efficiency is determined by multiplying the formation voltage of a part by its capacitance, and then dividing by the product by the volume of the part. For example, a formation voltage may be 175 volts for a part having a capacitance of 520 μF, which results in a product of 91,000 μF*V. If the part occupies a volume of about 0.8 cm³, this results in a volumetric efficiency of about 113,750 μF*V/cm³.

The capacitor may also exhibit a high stored energy that enables it suitable for use in high pulse applications. Energy is generally determined according to the equation $E = 1/2*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz (e.g., 120 Hz) and a temperature of about 23° C. For example, the capacitor may exhibit a stored energy of about 2.0 joules per cubic centimeter (J/cm³) or more, in some embodiments about 3.0 J/cm³, in some embodiments from about 3.5 J/cm³ to about 10.0 J/cm³, and in some embodiments, from about 4.0 to about 8.0 J/cm³. The capacitance may likewise be about 1 milliFarad per square centimeter ("mF/cm²") or more, in some embodiments about 2 mF/cm² or more, in some embodiments from about 5 to about 50 mF/cm², and in some embodiments, from about 8 to about 20 mF/cm². The capacitor may also exhibit a relatively high "breakdown voltage" (voltage at which the capacitor fails), such as about 180 volts or more, in some embodiments about 200 volts or more, and in some embodiments, from about 210 volts to about 260 volts.

The equivalent series resistance ("ESR")—the extent that the capacitor acts like a resistor when charging and discharging in an electronic circuit—may also be less than about 15,000 milliohms, in some embodiments less than about 10,000 milliohms, in some embodiments less than about 5,000 milliohms, and in some embodiments, from about 1 to about 4,500 milliohms, measured with a 2-volt bias and 1-volt signal at a frequency of 120 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 μA/μF*V, in some embodiments less than about 0.5 μA/μF*V, and in some embodiments, less than about 0.1 μA/μF*V, where μA is microamps and μF*V is the product of the rated capacitance and the rated voltage. Leakage current may be measured using a leakage test meter (e.g., MC 190 Leakage test, Mantracourt Electronics LTD, UK) at a temperature of about 23° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 volts and approximately 850 volts, or, desirably, between approximately 600 Volts and approximately 900 volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device may also contain a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following examples.

Materials Employed

The following derivatives were employed in the examples.
EDT=2,3-Dihydrothieno[3,4-b]-1,4-dioxin (Hereaus)
EDT-OH=(2,3-Dihydrothieno[3,4-b][1,4]dioxin-2-yl) methanol (Sigma Aldrich)

Test Procedures

Equivalent Series Resistance (ESR)
Equivalence series resistance may be measured using a Keithley 3330 Precision LCZ meter with Kelvin Leads 2.2 volt DC bias and a 0.5 volt peak to peak sinusoidal signal. The operating frequency was 120 Hz and the temperature was 23° C.±2° C.

Capacitance
The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:
Leakage current ("DCL") was measured using a leakage test set that measures leakage current at a temperature of was 23° C.±2° C. and at the rated voltage after a minimum of 60 seconds.

EXAMPLE 1

Initially, 10 pieces of cylindrical tantalum cans with a size of 18.3 mm (length)×9.1 mm (internal diameter) were sandblasted with a JetStreem Blaster II (SCM System, Inc.). The sandblasting time was 20 seconds. These samples were then degreased in water in an ultrasonic bath and then dried at a temperature of 85° C. for 5 minutes. A precursor solution was thereafter applied to the microroughened surface that contained 4 g of ethanol (Sigma-Aldrich), 0.1 g of methylpyrrolidone (Sigma-Aldrich), 1 g of EDT, and 10 g of 40% butanol solution of iron(III)-p-toluene sulfonate (Heraeus). The tantalum cans were filled to the control level with the polymerization precursor solution for 5 minutes and were then put into a drying oven at 85° C. for 15 minutes. The resulting structure of poly(3,4-ethylenedioxythiophene) was washed in methanol to remove reaction by-products for 5 minutes and the tantalum cans were put into a drying oven at 85° C. for 5 minutes. This polymerization cycle was repeated 4 times. Next, 10 pieces of a cylindrical anode were pressed with five symmetrical longitudinally extending channel which were recessed into the anode body. The anodes were pressed to a size of 17.3 mm (length)×7.2 mm (diameter) and anodized to 175V (the single anode exhibited a capacitance of 330 μF at a frequency of 120 Hz) were added into the previously prepared cans. The electrolyte was a 5.0 M aqueous solution of sulfuric acid (specific gravity of 1.26 g/cm$^3$). The components were then assembled into a wet capacitor.

EXAMPLE 2

Wet capacitors were formed in the manner described in Example 1, except that 1.21 g of EDT-OH was used instead of 1 g of EDT.

EXAMPLE 3

Initially, 10 pieces of cylindrical tantalum cans with a size of 18.3 mm (length)×9.1 mm (internal diameter) were sandblasted with a JetStreem Blaster II (SCM System, Inc.). The sandblasting time was 20 seconds. These samples were then degreased in water in an ultrasonic bath and then dried at a temperature of 85° C. for 5 minutes. In a beaker, 3.27 g dodecyl benzene sulfonic acid (Sigma Aldrich) was dissolved in 100 ml of deionized water. 1.42 g of EDT was added to the aqueous solution and heated to 75° C. At 75° C., the emulsion became a homogeneous solution. Upon cooling the precipitate is filtered and the clear solution is used for anodic electrochemical polymerization. A roughened tantalum can was filled with clear aqueous solution of EDT and then electrically connected to the positive pole of a power supply and a stainless steel wire was electrically connected to the negative pole of the power supply. Electro-polymerization was then performed using a power supply setting of 5V and 5 mA for 20 minutes. The conductive polymer coating deposited over the entire surface of the tantalum can. Next, 10 pieces of a cylindrical anode were pressed with five symmetrical longitudinally extending channel which were recessed into the anode body. The anodes were pressed to a size of 17.3 mm (length)×7.2 mm (diameter) and anodized to 175V (the single anode exhibited a capacitance of 330 μF at a frequency of 120 Hz) were added into previous prepared cans. The electrolyte was a 5.0 M aqueous solution of sulfuric acid (specific gravity of 1.26 g/cm$^3$). The anode was then assembled via standard route to get wet capacitor.

EXAMPLE 4

Wet capacitors were formed in the manner described in Example 3, except that 1.72 g of EDT-OH was used instead of 1.42 g of EDT.

The finished wet capacitors of Examples 1-4 were then tested for electrical performance (i.e., leakage current, ESR, and capacitance). The measurements were conducted at was 23° C.+2° C. and then repeated after 2000 hours of life testing at a temperature of was 85° C.±2° C. and an applied rated voltage of 85V. The results are set forth below.

| Sample | Electrical Performance at 23° C. | | | Electrical Performance after 2,000 hours, 85° C./85 V | | |
|---|---|---|---|---|---|---|
| | CAP [μF] | ESR [mΩ] | DCL [μA] | CAP [μF] | ESR [mΩ] | DCL [μA] |
| Example 1 | 284.5 | 230 | 1.0 | 284.1 | 233 | 0.4 |
| Example 2 | 289.1 | 252 | 1.2 | 287.0 | 256 | 0.5 |
| Example 3 | 286.8 | 508 | 1.1 | 286.3 | 501 | 0.5 |
| Example 4 | 285.3 | 421 | 1.2 | 284.9 | 417 | 0.5 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:

an anode comprising a sintered porous anode body that is coated with a dielectric;

a cathode that comprises a metal substrate over which is disposed a conductive polymer coating, wherein the conductive polymer coating contains an alkyl-substituted poly(3,4-ethylenedioxythiophene) having the following general structure:

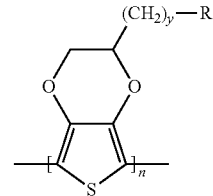

wherein, n is from 1 to 2,000;

y is from 1 to 10; and

R is a linear or branched, optionally substituted $C_1$ to $C_{18}$ alkyl radical, optionally substituted $C_5$ to $C_{12}$ cycloalkyl radical, optionally substituted $C_6$ to $C_{14}$ aryl radical, optionally substituted $C_7$ to $C_{18}$ aralkyl radical, optionally substituted $C_1$ to $C_4$ hydroxyalkyl radical, hydroxyl radical, or a combination thereof; and a fluid working electrolyte in communication with the anode and the cathode.

2. The wet electrolytic capacitor of claim 1, wherein y is from 1 to 3.

3. The wet electrolytic capacitor of claim 1, wherein R is hydroxyl, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane, alkoxysilane, carboxylamide, or a combination thereof.

4. The wet electrolytic capacitor of claim 1, wherein the alkyl-substituted poly(3,4-ethylenedioxythiophene) has the following general structure:

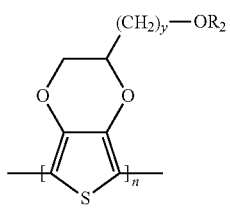

wherein, $R_2$ is hydrogen or an alkyl group.

5. The wet electrolytic capacitor of claim 1, wherein the conductive coating contains hydroxyethylated poly(3,4-ethylenedioxythiophene), hydroxymethylated poly (3,4-ethylenedioxythiophene), or a combination thereof.

6. The wet electrolytic capacitor of claim 1, wherein the metal substrate includes titanium or tantalum.

7. The wet electrolytic capacitor of claim 1, wherein the metal substrate has a generally cylindrical shape.

8. The wet electrolytic capacitor of claim 1, wherein the porous body is formed from a tantalum powder.

9. The wet electrolytic capacitor of claim 1, wherein the fluid electrolyte is aqueous.

10. The wet electrolytic capacitor of claim 1, wherein the fluid electrolyte includes sulfuric acid.

11. The wet electrolytic capacitor of claim 1, wherein the substrate is in the form of a casing within which the anode and the fluid electrolyte are positioned.

12. The wet electrolytic capacitor of claim 1, wherein the anode body contains a sidewall positioned between a proximal end and an opposing distal end, wherein a plurality of longitudinally extending channels recessed into the sidewall.

13. The wet electrolytic capacitor of claim 1, wherein the anode body has a generally cylindrical shape.

14. A wet electrolytic capacitor comprising:
an anode containing a generally cylindrical, sintered porous anode body that is coated with a dielectric, the anode body containing tantalum, wherein the anode further comprises an anode lead wire that extends from a proximal end of the anode in the longitudinal direction;
a fluid working electrolyte; and
a generally cylindrical metal casing within which the anode and the fluid electrolyte are positioned, wherein a conductive polymer coating is disposed on the metal casing so that the coating is in communication with the fluid electrolyte, wherein the conductive polymer coating contains an alkyl-substituted poly(3,4-ethylenedioxythiophene) having the following general structure:

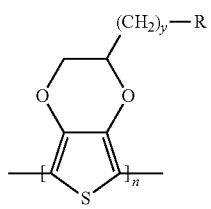

wherein,
n is from 1 to 2,000;
y is from 1 to 10; and
R is a linear or branched, optionally substituted $C_1$ to $C_{18}$ alkyl radical, optionally substituted $C_5$ to $C_{12}$ cycloalkyl radical, optionally substituted $C_6$ to $C_{14}$ aryl radical, optionally substituted $C_7$ to $C_{18}$ aralkyl radical, optionally substituted $C_1$ to $C_4$ hydroxyalkyl radical, hydroxyl radical, or a combination thereof.

15. A method for forming a cathode of a wet capacitor, the method comprising:
applying a colloidal suspension to a metal substrate, wherein the colloidal suspension comprises an alkyl-substituted 3,4-ethylenedioxythiophene precursor monomer, surfactant, and a solvent, wherein the precursor monomer is an alkyl-substituted 3,4-ethylenedioxythiophene having the following general structure:

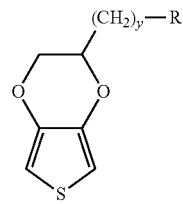

wherein,
y is from 1 to 10; and
R is a linear or branched, optionally substituted $C_1$ to $C_{18}$ alkyl radical, optionally substituted $C_5$ to $C_{12}$ cycloalkyl radical, optionally substituted $C_6$ to $C_{14}$ aryl radical, optionally substituted $C_7$ to $C_{18}$ aralkyl radical, optionally substituted $C_1$ to $C_4$ hydroxyalkyl radical, hydroxyl radical, or a combination thereof;
placing an electrode in contact with the metal substrate; and
supplying a current feed to the electrode to induce electrolysis and oxidative polymerization of the precursor monomer, thereby forming a conductive polymer coating that contains an alkyl-substituted poly(3,4-ethylenedioxythiophene).

16. The method of claim 15, wherein y is from 1 to 3.

17. The method of claim 15, wherein R is hydroxyl, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane, alkoxysilane, carboxylamide, or a combination thereof.

18. The method of claim 15, wherein the precursor monomer is hydroxyethylated 3,4-ethylenedioxythiophene, hydroxymethylated 3,4-ethylenedioxythiophene, or a combination thereof.

19. The method of claim 15, wherein the metal substrate includes titanium or tantalum.

20. The method of claim 15, wherein the surfactant is an anionic surfactant, nonionic surfactant, or a combination thereof.

21. The method of claim 15, wherein the colloidal suspension includes a sulfonic acid.

22. The method of claim 15, wherein the solvent is water.

23. The method of claim 15, wherein the colloidal suspension and the conductive polymer coating are both free of high energy iron radicals.

24. The method of claim 15, wherein precursor monomers constitute from about 0.1 wt. % to about 15 wt. % of the colloidal suspension, surfactants constitute from about 0.2 wt. % to about 10 wt. % of the colloidal suspension, and sulfonic acids constitute from about 0.1 wt. % to about 10 wt. % of the colloidal suspension.

25. A wet capacitor cathode formed from the method of claim 15.

* * * * *